United States Patent
Weiss

[15] 3,645,397
[45] Feb. 29, 1972

[54] MECHANICAL CLASSIFIER

[72] Inventor: Viktor Weiss, Radenthein, Austria

[73] Assignee: Osterreichisch-Amerikanische Magnesit Aktiengesellshaft

[22] Filed: Nov. 18, 1969

[21] Appl. No.: 877,613

[30] Foreign Application Priority Data

Nov. 20, 1968 Austria ..................... A 11275/68

[52] U.S. Cl. ........................................ 209/464, 209/500
[51] Int. Cl. ................................................... B03b 3/32
[58] Field of Search ............. 209/464, 500, 461, 463, 18, 209/172.5; 134/65, 132

[56] References Cited

UNITED STATES PATENTS

| | | | |
|---|---|---|---|
| 1,984,362 | 12/1934 | Dickson | 209/464 |
| 2,353,152 | 7/1944 | Erck | 209/464 X |
| 2,368,416 | 1/1945 | Holt | 209/464 X |
| 1,972,195 | 9/1934 | Lacy | 209/463 |
| 2,373,662 | 4/1945 | Dickson | 209/464 X |
| 2,428,789 | 10/1947 | Dickson | 209/464 X |

Primary Examiner—Tim R. Miles
Assistant Examiner—Ralph J. Hill
Attorney—Howson and Howson

[57] ABSTRACT

A mechanical classifier for separating sludge into coarse grained and fine-grained portions, and having a trough with a bottom ascending at a slant above which a conveying mechanism is disposed for advancing the coarse-grained material upwardly along the trough bottom. A weir for overflow of the fine-grained material is located at the deep end of the trough, and a sludge inlet is provided above the level of the weir for introducing the sludge into the trough. Supplementary water is applied to the trough between the sludge inlet and the discharge end of the trough bottom through at least one conduit which extends transversely over the trough bottom and upwardly of the two sidewalls of the trough above the level of the sludge bath established by the weir. The conduit includes a protective shield facing the sludge inlet and ascending at a slant toward the trough axis. Supplementary water supplied to the conduit passes therefrom through openings below the bath level preferably formed as slits in the conduit wall facing toward the discharge end of the trough. To increase the separating capability of the classifier, additional conduits may be provided, preferably arranged in spaced transverse zones to permit sedimentation of the materials between the zones.

8 Claims, 5 Drawing Figures

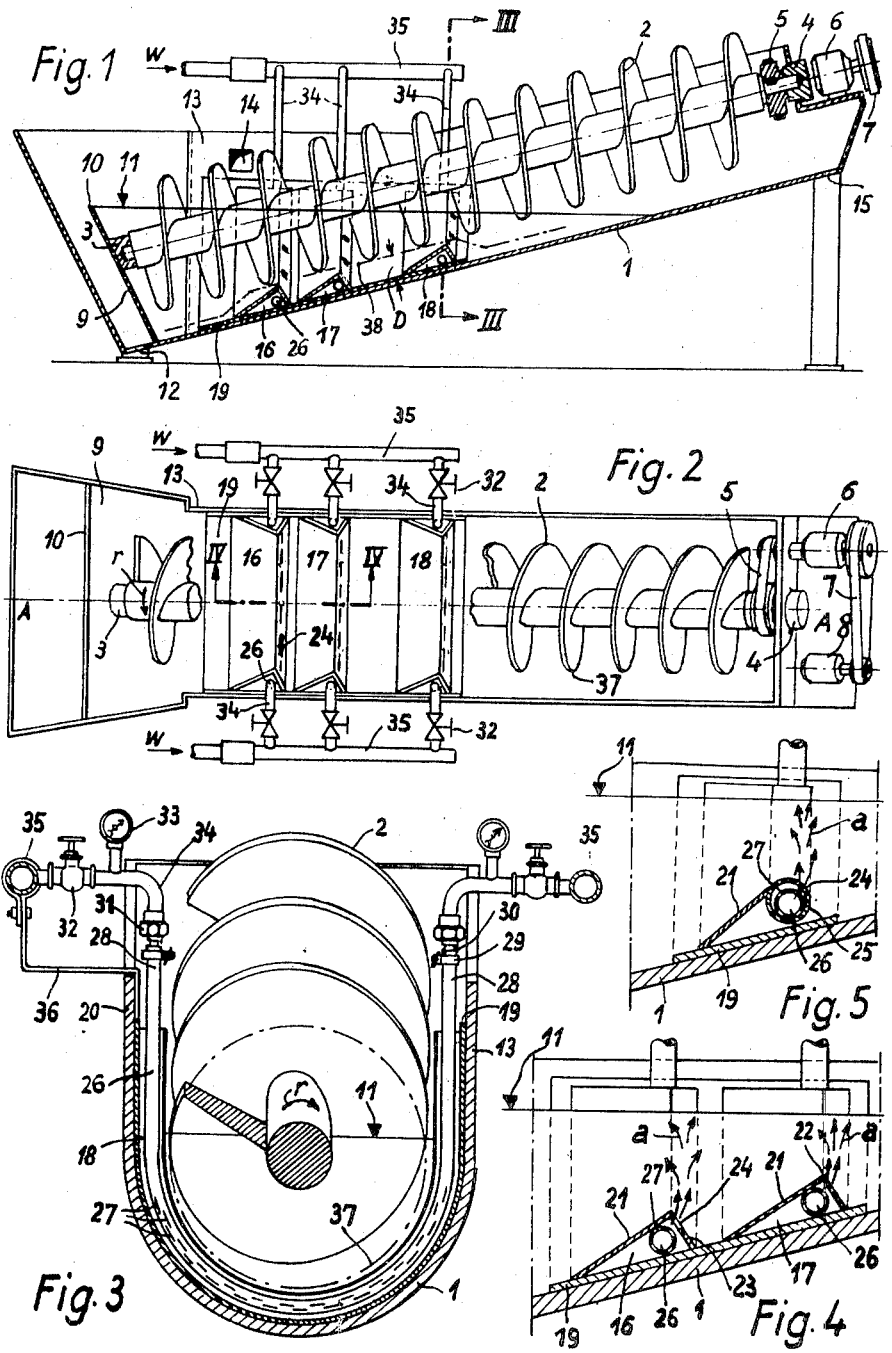

MECHANICAL CLASSIFIER

The invention concerns a mechanical classifier having the purpose of separating a sludge into a coarse-grained sediment and a portion containing the fine-grained material, and having a trough with a bottom that ascends at a slant, over which is disposed a conveying mechanism for pushing forward the sediment, having an inlet for the sludge, having an overflow for the portion which contains the fine-grained material, and having a discharge for the sediment which is conveyed by the conveying mechanism to the higher end of the trough bottom, and equipped with a contrivance for supplying supplementary water to the sludge.

Depending on the type of classifier, the conveying mechanism is a raking band or a scraping band, a conveyor worm, or the like. The coarse-grained sediment is brought out of the sludge upon the bottom of the slanting upward trough, and is conveyed to the discharge. The portion of the sludge which contains the fine-grained material is allowed to flow away at the lower end of the trough, through the overflow, which is usually made as a weir.

The classifying effect of mechanical classifiers is based on the principle of equal settling by gravitation. Grains having more than a certain sinking speed sink to the bottom, and this sunk material or sediment is conveyed by the conveying mechanism to the discharge. The fine grains (mud) which have a slower sinking speed flow along with the sludge off by way of the overflow.

For various reasons the sought for separation by means of equal settling takes place only imperfectly, and with an inaccurate separation, because on the one hand a part of the sludge becomes discharged along with the sunk material or sand, and on the other hand a part of the coarse-grained material gets into the overflow. These imperfect outputs must be ascribed chiefly to the so-called impeded settling of the granular material, a phenomenon which begins to occur with a more than about 15 percent content of solid materials in the sludge. Additional causes for the imperfect outputs are the clinging of the finer particles (adhering grains) to the larger grains, and agglomerates of fine grains being carried along by the coarse grains into the sediment.

The supplementary water supplied flows when introduced into the sludge through the layer of material which has been pushed forward between the trough bottom and conveyor mechanism toward the discharge and which consists of coarse-grained sunk material, and the water is intended to free the fine grains, or agglomerates of them, from the coarse grains which enclose them or to which they cling, and to drive them up into the part of the sludge flowing toward the overflow, for the purpose of decreasing the erroneous portion of fine-grained material in the sunk material or sediment carried off to the discharge, thus improving the separating sharpness of the classifier.

For this purpose, in the case of the known classifiers, the supplementary water is brought in through a plurality of openings which are distributed and constructed, between the sludge inflow and the zone situated at the discharge end of the sludge bath, in such a way that the supplementary water enters into the sludge over the entire zone in as uniform a distribution as possible. Hereby for example there can be installed in the trough a sieve plate set parallel to the trough bottom, above which sieve plate there runs a conveyor device provided with scrapers. The supplementary water enters from the sides, at a number of uniformly spaced places, into the space of the trough below the sieve plate, and flows in uniform distribution through the sieve holes into the sludge.

In the case of another known form of construction there is likewise a sieve above the trough bottom. In this case the supplementary water is conducted into the intermediate space situated between the trough bottom and the sieve, and it emerges from there out of tubes set transversely of the trough, and having in them numerous openings arranged in such a way that the emerging supplementary water becomes divided up fanwise, for the purpose of entering, after it has passed through the sieve, as uniformly as possible into the sludge.

As a result of the arrangement and distribution of the openings in the case of the classifiers referred to in the foregoing and in the case of other classifiers, the numerous closely adjacent openings in the longitudinal and transverse directions of the trough produce in a large region a more or less uniform ascending current flow. Through this the sludge in the said region is set into general turbulence, which does in fact promote the loosening of fine grains from the sunk material, but which however at the same time greatly hinders the settling of the grains by equal settling. Furthermore, as a result of the great turbulence of the sludge in this region, fine material out of the upper part of the sludge sinks downward into the sunk material or sediment, and coarse grains become driven upward out of this sediment into the upper part of the sludge, through which the sharpness of separation of the classifier becomes impaired and the parting line between fine and coarse grain will tend to the coarse grain.

The invention has the purpose of constructing a mechanical classifier of the kind described at the outset, in such a way that the sludge by means of the supplementary water supplied becomes set into turbulence in as few as possible separate upward flow zones, which suffice for an as extensive as possible removal-loosening of the fine-grained particles out of the sunk material or sediment, and for the transfer of these fine-grained particles into the part of the sludge flowing toward the overflow, but which however does not disturb the unobstructed settling of the grains over a great region of the sludge. By this means it is possible to decrease the proportion of fine grains in the sunk material and to increase it in the overflow.

In accordance with the invention this objective is attained in that, with a mechanical classifier of the described kind, there is disposed in the region between the sludge inflow and the discharge end of the sludge bath and at the inside of the trough at least one conduit for supplying the supplementary water, which extends over the trough bottom transversely of the longitudinal direction of the trough and at both sidewalls of the trough upward to above the surface level of the bath, and which is provided with openings for the outflow of the supplementary water. Preferably the conduit has, at its end turned toward the sludge inlet, a protective shield ascending at a slant from the inside of the trough toward its longitudinal middle axis, and supported at its free rim, at its end toward the discharge, against the inside of the trough, and it is, in its wall turned toward the discharge, and in the region of it below the surface level of the sludge bath, provided with openings preferably slit shaped, for the emergence of the supplementary water.

This form of construction of the mechanical classifier according to the invention offers many significant advantages, which include the elimination of openings in the trough walls, the permissible connection of the conduit to a supply pipe of water under pressure without boring through the trough walls, and the use of an upward slanting protective shield which can be made from a suitable strong and rigid material, through which wear from the friction of the sedimentary material can be kept very small. With the openings for the emergence of the supplementary water made slit shaped, and with their disposal in the wall of the conduit at the discharge end of the conduit, an entry of fine grains into the conduit is prevented or is at least made minimal, and wear or damage of the edges of the openings is scarcely to be feared.

In accordance with a further characteristic of the invention there are disposed in the trough at least two conduits parallel to one another in a transverse zone, their spacing apart being relatively small, and being preferably only a little greater than the width of the protective shield measured in the lengthwise direction of the trough. When use is made of two conduits disposed in this way, through the upward flowing turbulence produced in this region, there is generally produced a substantial increase in the separating sharpness of the classifier.

If it is desired to increase the separating sharpness of the classifier to a particularly great degree, in accordance with a further characteristic of the invention there may be disposed, in another transverse zone adjoining a transverse zone having two conduits, another conduit for the supply of supplementary water, whereby its spacing or the spacing of its openings from the openings of the neighboring conduit of the first transverse zone must be great enough for a zone of as undisturbed sedimentation as possible to be left between them. This spacing in general amounts to a multiple, for example at least quadruple, of the spacing of the openings in the conduits of the said first transverse zone as measured in the lengthwise direction of the trough. With this arrangement of the conduits there is produced in the sludge, beyond the first upward flow turbulence zone which is formed by one or two conduits a further turbulence zone. In practically almost all cases this suffices to liberate from the sunk material or sediment the final residues of any fine-grained material that may still be contained in it.

From the construction point of view, the conduits can be made very simply. In accordance with one form of construction their wall turned toward the sludge inlet is formed of the protective shield rising slantingly inside the trough, and the wall turned toward the discharge end of the trough consists of a support wall connected to the free rim of the protective shield and to the inside of the trough, in which are made openings, slit openings in particular, for the emergence of the supplementary water. In accordance with another form of construction the conduit consists of a tube which at its end turned toward the sludge inlet is connected to the free rim of the protective shield, and which at the part of the tube wall turned toward the discharge end of the trough is provided with openings for the emergence of the supplementary water.

In accordance with one particularly advantageous further development of the mechanical classifier of the invention through the conduit or through each conduit there is passed a flexible hose, made for example of rubber or of synthetic material which extends out of the upper rims of the conduit and to which there can be connected a supply line of water under pressure, and has a plurality of slits disposed in the hose wall for the emergence of the supplementary water. The slit openings in the hose are advantageously made in the form of cuts made in the lengthwise direction into the hose, which have a self-closing action similar to that of check valves, preventing entry of sludge into the hose. By means of the protective shield and of the other parts of the wall the hose is well protected against wear or damage, and, if need be, it can, after the supply of water under pressure is shut off, be pulled in a simple manner out of the conduit, and after this conduit has been given the washing out that is needed if desired it can be replaced by another hose.

The hose or hoses are advantageously connected at each end in turn to a supply line of water under pressure, through which the pressure gradient, which would exist with connection at one end only, is substantially eliminated.

Each connection line of the pressurized water supply is advantageously provided with its separate regulating valve, for the purpose of making it possible to regulate in each conduit the quantity of supplementary water supplied and its pressure, in a suitable manner.

With one particularly advantageous form of construction of the classifiers of the invention all conduits are mounted on a common supporting metal sheet that can be inserted to fit into the trough, whereby if desired the tubes supplying water under pressure are mounted with their connection pipes on connectors that can be fastened to the upper part of the trough sidewalls or to the support sheet for the conduits. In the case of this form of construction the entire arrangement for supplying the supplementary water can be made in a form that corresponds to the size and shape of the trough and ready to be installed in that trough, and, after removal of the conveyor worm or of the raking or scraping band, it can be inserted into the trough, after which, when the conveying mechanism has been put back, the classifier is ready for operation.

Interchanging or replacing the hoses can be considerably facilitated and simplified if each hose is at both its ends attachable, by means of ordinary hose clips, to hose nozzles, which can be connected by means of detachable hose couplings to the connection tubes of the pipes supplying the water under pressure. By these means the time needed to replace a hose can be shortened to such an extent that the operation of the classifier does not need to be interrupted at all, the only thing necessary being to interrupt the flow of water to the hose concerned.

For the purpose of preventing contact of the conveyor mechanism with the walls of the conduits, but however to ensure an effective pushing forward of the sediment in the unobstructed region of the trough, in the case of a classifier according to the invention the spacing between the outer rim of the material-driving element of the conveyor mechanism and the inner surface of the trough in the region of the conduits can be made greater than the spacing between these two parts in the unobstructed part of the trough by an amount corresponding to the radial height of the conduits. In the case of conveyor worms this can be done through a suitable milling off of the rim part of the worm blade, or in the case of conveyors having raking or scraping bands by means of laterally disposed rollers or slide rails in the region of the conduits.

The invention will be explained in more detail in the following with reference to the forms of construction illustrated in the drawing.

Referring to the drawings, FIG. 1 shows in longitudinal section a mechanical classifier according to the invention equipped with a conveyor worm;

FIG. 2 shows a plan view of the classifier of FIG. 1;

FIG. 3 is a sectional view taken along line III—III of FIG. 1;

FIG. 4 is a sectional view taken along line IV—IV of FIG. 2; and

FIG. 5 is a view similar to FIG. 4 showing a modified form of the invention.

Referring to the drawings and particularly the embodiment of the invention shown in FIGS. 1 to 4, the mechanical classifier has a trough having an upward slanting bottom 1, above which is disposed the conveyor mechanism, in the form of a conveyor worm 2, which in the case of the example of construction is mounted rotatably in two bearings 3 and 4, and which is driven in the direction of the arrow $r$ through the intermediary of a belt drive 5 from a reduction gear 6, whereby the reduction gear drive 6 is in its turn driven by a belt drive 7, driven for example by an electromotor 8.

The trough has near its lower end a weir formed of a partition 9, whose upper edge 10 determines the surface level 11 of the sludge, which together with the fine-grained material it contains flows over the partition to an outlet 12. In the one sidewall 13 of the trough there is provided an inflow 14 for the sludge, and at the higher end of the trough is disposed a discharge 15 for the coarse-grained sediment conveyed to this upper end by the conveyor worm 2.

In the trough there are disposed on the trough bottom 1 conduits, which in the illustrated example of construction are three conduits 16, 17, 18, provided with openings 24. In the present case these conduits are not fastened to the trough wall itself, but are mounted on a common supporting metal sheet 19 which is inserted into the trough. The spacing between the openings 24 of the two conduits 16 and 17 is relatively small, in proportion to the trough length that is, whereas the spacing of the openings of the third conduit 18 from those adjacent conduit 17 is substantially greater than, and at least four times as great as that of the spacing between the openings of the two conduits 16 and 17. In the drawing, for reasons of clarity, the spacing between the openings of the conduits 16 and 17 is shown greater than actuality.

Each conduit runs transversely of the longitudinal axis A—A of the trough, above the trough bottom 1, and extends upward, at the inner face of the two sidewalls 13, 20 of the trough, to above the surface level 11 of the sludge.

Each conduit has, at its side turned toward the inflow 14 for the sludge, a protective shield 21, which slants upward toward the trough axis from its edge connected to the support sheet 19 or the trough wall. The conduit can hereby be made in different ways. In FIG. 5, the conduit consists of a tube 25, which is provided with numerous outlet openings 24 in the form of elongated slits, for the supplementary water, along the tube axis, and it is connected at its side turned toward the sludge inlet 14 to the protective shield 21. In the modified example shown in FIG. 4 the protective shield 21 itself forms the wall of the conduit 16 and 17 respectively turned toward the sludge inlet 14, and at the side turned toward the discharge 15 the wall of the conduit consists of a support wall 23, connected to the free rim 22 of the protective shield 21 and to the support sheet 19 or the trough bottom 1, and in which are made numerous slitlike openings 24 for the emergence of the supplementary water and disposed below the surface level 11 of the sludge.

In the preferred example of the invention, the conduits 16, 17, 18, 25 have flexible hoses 26, made for example of rubber or of synthetic material, run through them, these hoses being provided with a series of cut-in slits 27 for the emergence of the supplementary water, they being self-closing similar to check valves, so as to permit an outflow of water from the hose, while preventing an entry of sludge into the hose.

As can be seen from FIG. 3, at each end 28 where it emerges from the associated conduit, the hose 26 is for example by means of a commercial clip 29 fastened to a hose nozzle 30, which in its turn can by means of a suitable screw-threaded hose coupling 31 be connected to a connector 34 of a pipe 35 supplying water under pressure and equipped with a regulatory valve 32 and a pressure gauge 33, inside which pipe supplementary water under pressure greater than the counter pressure exerted by the sludge is supplied in the direction of the arrow w in FIGS. 1 and 2.

When the conduits are mounted on a common support sheet 19, the pressure water pipes 35, together with their connecting pipes 34, can advantageously be mounted on supports 36, which can be fastened to the upper part of the trough side walls or to the common support plate 19 of the conduits. In this case the complete arrangement for the supply of supplementary water can be combined into a unit ready to install, which after removal of the conveyor worm or of some other conveying arrangement from the trough can be inserted into the said trough.

In the region of the conduits, for the purpose of keeping the spacing of the edge of the drive element of the conveying mechanism, for example the outer rim 37 of the conveyor worm 2, away from the contour of the conduits by a distance as great as that separating the worm from the trough bottom in the clear space of the trough, in the case of a conveyor worm its outer rim in the region of the conduits can be machined off as indicated by the schematic profile line 38 of FIG. 1, where the conveyor worm is shown of uniform diameter along its entire length.

The invention is not limited to the illustrated and described form of construction, and its design may be modified within the scope of the invention as defined in and limited solely by the appended claims.

I claim:

1. A mechanical classifier for the separation of a sludge into a coarse-grained sediment and a portion containing the fine-grained material, comprising a trough having an inclined bottom, a conveyor mechanism in said trough for moving the sediment upwardly along said inclined trough bottom, a weir at the lower end of said inclined trough bottom for overflow of the fine-grained material, discharge means in said trough adjacent the upper end of said inclined trough bottom above the level of said weir, an inlet for the sludge adapted to introduce the sludge into said trough intermediate said weir and the discharge end of said trough, said conveying mechanism being adapted to move the sediment toward and into said discharge means, and means for conducting supplementary water into the sludge, the improvement wherein said means for conducting supplementary water into the sludge comprises at least one conduit in the region between the sludge inlet and the discharge end of the trough bottom, said conduit extending transversely over the trough bottom and upwardly at the two sidewalls of the trough to above the weir level, said conduit having at its side turned toward the sludge inlet a protective shield which ascends at a slant from the inside of the trough toward its longitudinal middle axis, said conduit including a wall turned toward the trough discharge end having openings therein in the region situated below the weir level for the emergence of the supplementary water.

2. A mechanical classifier in accordance with claim 1, characterized in that there are disposed in the trough, in a first transverse zone, at least two conduits which run parallel to one another, and whose spacing apart from one another is small relatively to the trough length, and is preferably only a little greater than the width of the protective shield measured in the lengthwise direction of the trough.

3. A mechanical classifier in accordance with claim 2, characterized in that at the discharge side and adjoining said first transverse zone having at least two conduits, at least one additional conduit is disposed in another transverse zone for supplying supplementary water, whereby the spacing of its openings from the openings of the adjacent conduit in the first transverse zone is at least four times as great as the spacing of the openings of the two conduits of the first transverse zone from one another.

4. A mechanical classifier in accordance with claim 2, characterized in that all the conduits are mounted on a common supporting metal sheet which can be inserted into the trough, whereby if desired the pipes supplying water under pressure are mounted by connector pipes on supports which can be fastened to the upper part of the trough sidewalls or advantageously to the supporting metal sheet of the conduits.

5. A mechanical classifier in accordance with claim 1, characterized in that each wall of a conduit turned toward the sludge inlet is formed of the protective shield sloping up from the trough inside, and the conduit wall turned toward the discharge end of the trough consist of a support wall connected to the free rim of the protective shield and to the trough inside, and in this wall are made openings for the emergence of the supplementary water.

6. A mechanical classifier in accordance with claim 5, characterized in that the conduit consists of a tube which at its side turned toward the inlet for the sludge is connected to the free edge of the protective shield, and is at its part turned toward the discharge end of the trough provided in its tube wall with openings for the emergence of the supplementary water.

7. A mechanical classifier in accordance with claim 1, characterized in that through the conduit or through each conduit is run a flexible hose, made for example of rubber or of synthetic material, which extends out of the upper rims of the conduit and can be connected to a pipe supplying supplementary water under pressure, and is provided with a plurality of slits disposed in the hose wall, for the emergence of the supplementary water.

8. A mechanical classifier in accordance with claim 1, characterized in that the conduit is connected at both its ends to a pipe which supplies supplementary water under pressure.

* * * * *